United States Patent
Buzzo Titella

(10) Patent No.: US 10,857,712 B2
(45) Date of Patent: Dec. 8, 2020

(54) TANDEM MOLD FOR CREATING INJECTION-MOLDED PARTS FROM SYNTHETIC MATERIAL

(71) Applicant: PLASTISUD, Toulouse (FR)

(72) Inventor: Jacques Buzzo Titella, Castelnaudary (FR)

(73) Assignee: PLASTISUD, Toulouse (FR)

( * ) Notice: Subject to any disclaimer, the term of this patent is extended or adjusted under 35 U.S.C. 154(b) by 378 days.

(21) Appl. No.: 15/303,721

(22) PCT Filed: Nov. 27, 2014

(86) PCT No.: PCT/FR2014/053059
§ 371 (c)(1),
(2) Date: Jan. 6, 2017

(87) PCT Pub. No.: WO2015/158965
PCT Pub. Date: Oct. 22, 2015

(65) Prior Publication Data
US 2017/0144350 A1    May 25, 2017

(30) Foreign Application Priority Data

Apr. 15, 2014    (FR) ..................................... 14 53354

(51) Int. Cl.
*B29C 45/56*    (2006.01)
*B29C 45/26*    (2006.01)
(Continued)

(52) U.S. Cl.
CPC ........ *B29C 45/561* (2013.01); *B29C 45/2602* (2013.01); *B29C 45/32* (2013.01);
(Continued)

(58) Field of Classification Search
CPC ... B29C 45/561; B29C 45/2602; B29C 45/32; B29C 2045/5615; B29C 2045/564;
(Continued)

(56) References Cited

U.S. PATENT DOCUMENTS 2,938,232 A * 5/1960 Martin ................... B29C 43/00
425/562
4,519,763 A    5/1985 Matsuda et al.
(Continued)

FOREIGN PATENT DOCUMENTS

DE    1142058 B    1/1963
DE    7700625 U1    11/1980
(Continued)

OTHER PUBLICATIONS

Colombian Office Action and partial translation dated Sep. 22, 2018, in related application NC2016/0004055.

*Primary Examiner* — Joseph S Del Sole
*Assistant Examiner* — Jamel M Nelson
(74) *Attorney, Agent, or Firm* — Volpe Koenig

(57) ABSTRACT

A tandem mold for creating injection-molded parts from synthetic material includes a first part (2), a second part (4), a third part (6), and a guide (20, 22, 26, 28). A first parting surface is defined between the first part (2) and the third part (6), and a second parting surface is defined between the second part (4) and the third part (6). The mold also includes, for each parting surface, at least one mechanical stop (44) that is movable between a first position, where said stop prevents a drive mechanism from reaching the closed position of the mold, and a second position, or retracted position, where the mold can reach its closed position.

12 Claims, 5 Drawing Sheets

(51) Int. Cl.
  *B29C 45/32* (2006.01)
  *B29C 45/64* (2006.01)
  *B29C 45/66* (2006.01)

(52) U.S. Cl.
  CPC .............. *B29C 2045/564* (2013.01); *B29C 2045/5615* (2013.01); *B29C 2045/5665* (2013.01); *B29C 2045/648* (2013.01); *B29C 2045/665* (2013.01)

(58) Field of Classification Search
  CPC ...... B29C 2045/5665; B29C 2045/648; B29C 2045/665
  See application file for complete search history.

(56) References Cited

U.S. PATENT DOCUMENTS

| | | | |
|---|---|---|---|
| 5,382,158 A | | 1/1995 | Herbst |
| 5,811,135 A | * | 9/1998 | Kimura .................. B29C 33/02 249/163 |
| 6,402,497 B1 | * | 6/2002 | Banjyo ................ B29C 45/661 100/258 A |
| 2006/0003048 A1 | | 1/2006 | Jaroschek |
| 2006/0076713 A1 | | 4/2006 | Rossanese |
| 2007/0264378 A1 | | 11/2007 | Schwaighofer et al. |
| 2008/0265465 A1 | * | 10/2008 | Glaesener ............. B29C 45/561 264/328.1 |
| 2011/0193261 A1 | * | 8/2011 | Uragami ................. B29C 43/36 264/279 |

FOREIGN PATENT DOCUMENTS

| | | | |
|---|---|---|---|
| DE | 3311474 A1 | 12/1983 | |
| DE | 10110611 A1 | 11/2002 | |
| DE | 102004038852 A1 | 2/2006 | |
| DE | 102005009011 A1 | 4/2006 | |
| EP | 0064455 A1 | 11/1982 | |
| EP | 0116132 A1 | 8/1984 | |
| EP | 0425060 A2 | 5/1991 | |
| EP | 0576837 A1 | 1/1994 | |
| EP | 1784295 A1 | 5/2007 | |
| EP | 2508323 A1 | 10/2012 | |
| FR | 2295832 A1 | 7/1976 | |
| FR | 2295832 A1 * | 7/1976 | ......... B29C 45/6707 |
| GB | 2158389 A | 11/1985 | |
| JP | 01139232 A | 5/1989 | |
| WO | 8902357 A1 | 3/1989 | |
| WO | 0222340 A1 | 3/2002 | |
| WO | 2006027093 A1 | 3/2006 | |
| WO | 2009061200 A2 | 5/2009 | |

* cited by examiner

TANDEM MOLD FOR CREATING INJECTION-MOLDED PARTS FROM SYNTHETIC MATERIAL

FIELD OF THE INVENTION

The present invention relates to a tandem mold for creating injection-molded parts from synthetic material.

BACKGROUND

Methods for injection-molding parts from synthetic material are known to those skilled in the art and have been in use for many years. In such a method, a mold made with two parts defines a cavity of predetermined shape into which molten synthetic material is injected. The synthetic material is cooled in the mold, which is then opened to access the part this produces.

To speed up molding production rates, it is also known to create a tandem mold. The mold is then made with three parts: a fixed first part, a movable second part, and a third "floating" part arranged between the fixed first part and the movable second part. Impressions are created in the surfaces of these parts which are facing one another, thereby creating cavities between the fixed first part and the floating third part on the one hand, and between the movable second part and the floating third part on the other hand. In this manner a double mold, or two-tier mold, is created: when the mold is closed, all the cavities thus defined can be filled, and when the mold is opened, all the parts can be removed simultaneously. The production rate can thus be multiplied by about a factor of two.

Also known is a particular molding method in which the molten synthetic material is injected into the mold cavities before the mold is fully closed. This process is also known as injection-compression, because when the mold is fully closed the injected material already in the cavity is compressed and then spreads within the cavity.

The injection-compression method optimizes injection methods because on the one hand it facilitates injection and thus increases production rates, and on the other hand it increases flow length and thus optimizes the amount of synthetic material injected.

However, it is not known in the prior art to use a tandem mold in combination with an injection-compression method. Difficulties arise in such cases.

A method using injection-compression molding in a conventional two-part mold requires controlling the position of the mold parts during its closure and proper synchronization of the mold closing operation and of the injection of synthetic material into the cavities defined in the mold. In a two-tier mold of three parts, one fixed, one movable, and one floating, it is necessary during closure of the mold to control the position of the fixed part relative to the floating part (first parting surface) and of the movable part relative to the floating part (second parting surface). As the various mechanical stresses exerted on the floating part are not symmetrical, it is difficult to ensure proper positioning of the floating part, both in relation to the fixed part and to the movable part.

The object of the present invention is therefore to provide means for creating plastic parts by injection-compression in a tandem mold, also called a two-tier mold, meaning a mold having two parting surfaces with at least one cavity in each parting surface.

SUMMARY

An object of the invention is thus to provide a precise mechanical system enabling, in a three-part mold, a precise positioning of the three parts of the mold during its closure in order to allow precise control of the volume of each cavity.

To this end, a tandem mold is provided for creating injection-molded parts from synthetic material, comprising a first part, a second part, and a third part, as well as guide means allowing relative movement of the first part with respect to the third part and relative movement between the second part and the third part, a first parting surface being defined between the first part and the third part and a second parting surface being defined between the second part and the third part, the mold able to be placed in a so-called open position where the first parting surface and the second parting surface are open, meaning that the corresponding parts of the mold are spaced apart from one another, and in a so-called closed position where the first parting surface and the second parting surface are closed, meaning that the corresponding parts of the mold come into contact with one another.

According to the invention, this mold comprises, for each parting surface, at least one mechanical stop that is movable between a first position, or operative position, where said stop prevents the mold from reaching its closed position by defining a predetermined spacing for each parting surface between the corresponding parts of the mold, and a second position, or retracted position, where the mold can reach its closed position.

The proposed methods allow ensuring, in a two-tier mold (also called a tandem mold), precise relative positioning between the mold parts, by means of the stops. This precise positioning is useful for implementing an injection-compression method. Injection of the synthetic material can then be carried out in the period when the mold is partially open in the position defined by the stops.

A first embodiment provides that a stop is formed by an actuating cylinder arranged between two parts of the mold. In this embodiment, each parting surface comprises, for example, at least two actuating cylinders each forming a stop to ensure sufficiently constant spacing between two facing mold parts.

According to another embodiment, a stop is formed by a screw engaging with a nut, motorized means being provided to allow relative translation between the screw and the nut. An advantageous variant of this embodiment, enabling synchronization between the two parting surfaces, provides that the mold comprises:

a first screw engaged with a first nut between the first mold part and the third mold part, a second screw engaged with a second nut between the second mold part and the third mold part, the second screw being in the extension of the first and having a reversed thread relative to the thread of the first screw, the first nut and the second nut being integrally secured and being rotated by a same motor.

A third embodiment provides that a stop is in the form of a movable wedge, that the stop is arranged opposite a complementary fixed wedge, the stop and the fixed wedge forming a shim having two parallel faces spaced closer together or further apart depending on the position of the movable wedge relative to the fixed wedge. Here, each movable wedge may be associated with an actuating cylinder arranged transversely to the direction of movement of the movable parts of the mold.

Another alternative embodiment provides that the first part, the second part, and the third part of the mold bear mold stacks, each stack comprising a core mounted on a part and an impression mounted on a part facing the part bearing the corresponding core, and in each case at least one mechanical stop is arranged at a mold stack, between a peripheral area of the impression and a peripheral area of the corresponding core.

The various types of stops mentioned above may also be used in this last embodiment.

Different types of stops may be provided within the same mold, but in principle this is not a preferred embodiment. It is technically feasible, however.

The invention also relates to an injection molding machine, characterized in that it comprises a mold as described above.

BRIEF DESCRIPTION OF THE DRAWINGS

Features and advantages of the invention will become apparent from the following description, with reference to the accompanying drawings in which.

DETAILED DESCRIPTION OF THE PREFERRED EMBODIMENTS

Figure 1:
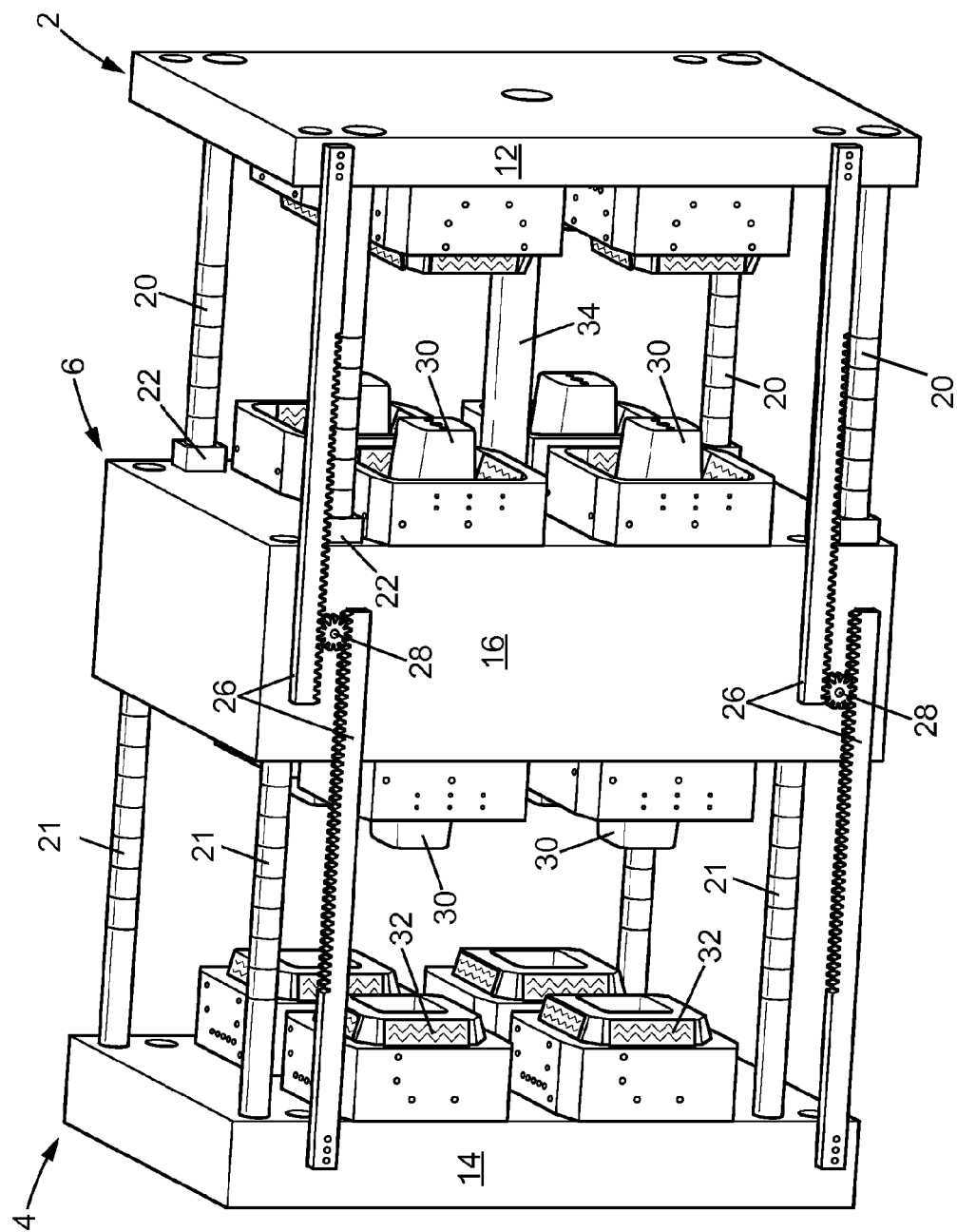
FIG. 1 is a perspective view of a tandem mold of the prior art.

FIG. 1 schematically illustrates a tandem mold, also known as a two-tier mold. As shown in this figure, the mold has three parts connected by guide means and driven by a mechanism described further below.

The structure illustrated in FIG. 1 is given as an illustrative and non-limiting example of a known mold that can be used for implementing the invention.

The illustrated mold comprises a fixed first part 2, a movable second part 4, and a floating third part 6 arranged between the fixed first part 2 and the movable second part 4.

Each of these three parts has a support 12, 14, 16 of rectangular parallelepiped shape, each support having substantially the same width and the same height but having a different thickness. The three supports are aligned, and we will call the main face of a support the face of the support that is facing another support (or another mold part).

First and second columns 20, 21 each connect a mold part to the facing mold part. Each guide column 20, 21 extends perpendicularly to a main face of a support. There are thus four guide columns 20, 21 arranged between the fixed first mold part 2 and the floating third mold part 6, and four guide columns between the movable second mold part 4 and floating third mold part 6. These guide columns 20, 21 are fixed relative to the fixed first part 2 or the movable second part 4 and are each slidable within a corresponding ring 22 fixed on the floating third part 6.

Such a mold is designed to be mounted on a press, not shown. The fixed first mold part 2 is then secured to a fixed part of the press while the movable second mold part 4 is secured to the movable part of the press. To achieve the movement of the floating third part 6, racks 26 and pinions 28 are provided. Two racks 26 are arranged parallel to the first and second guide columns 20, 21 (which are parallel to the direction of movement defined by the press on which the mold is mounted) and are attached to the fixed first part 2. Each of the racks 26 engages with a pinion 28 rotatably mounted on the floating third part 6. Each pinion 28 meshes in turn with another rack 26, parallel to the racks 26 attached to the fixed first part 2, but which are attached to the movable second part 4. It is thus apparent that the translational driving of the movable second part 4 by the press causes each pinion 28 to rotate and at the same time causes the movement of the floating third part 6 relative to the fixed first part 2 at half the speed of the movement of the movable second part 4 relative to the fixed first part 2.

Conventionally, to produce a molded part, an assembly is used that is also called a mold stack, said assembly comprising a first part with a core 30 and a second part with an impression 32. In the illustrated embodiment, each main face of the third support 16 of the floating third part 6 bears four first parts, thus a total of four cores 30, while the main face of the first support 12 and the face of the second support 14 each bear four second parts, thus a total of four impressions 32 on the first support 12 and four impressions 32 on the second support.

The mold in FIG. 1 is illustrated in the open position, the floating third part 6 and the fixed first part 2 being spaced apart from one another, as are the floating third part 6 and the movable second part 4.

When the drive means (comprising the racks 26 engaging with the pinions 28) close the mold, each time a peripheral area of each core 30 comes into contact with a peripheral area of the impression 32 of the mold stack. The contact surface around a core 30 and around a corresponding impression 32 is called the parting surface. Most often, this surface is planar and corresponds to the same plane for all cores 30 mounted on a same main face, said plane also being parallel to said main face. As indicated, "parting surface" is understood to mean a contact surface between the first part of a mold stack bearing a core and the second part of the mold stack bearing its impression, even if the surface is not planar.

In a manner known to those skilled in the art, in the closed position of the mold a cavity is defined between each core 30 and each corresponding impression 32, whose shape corresponds to the shape of the parts to be molded. An injection tube 34 is provided for feeding molten synthetic material into each cavity via a supply system that is illustrated very schematically in FIGS. 2 to 4.

Figure 2:
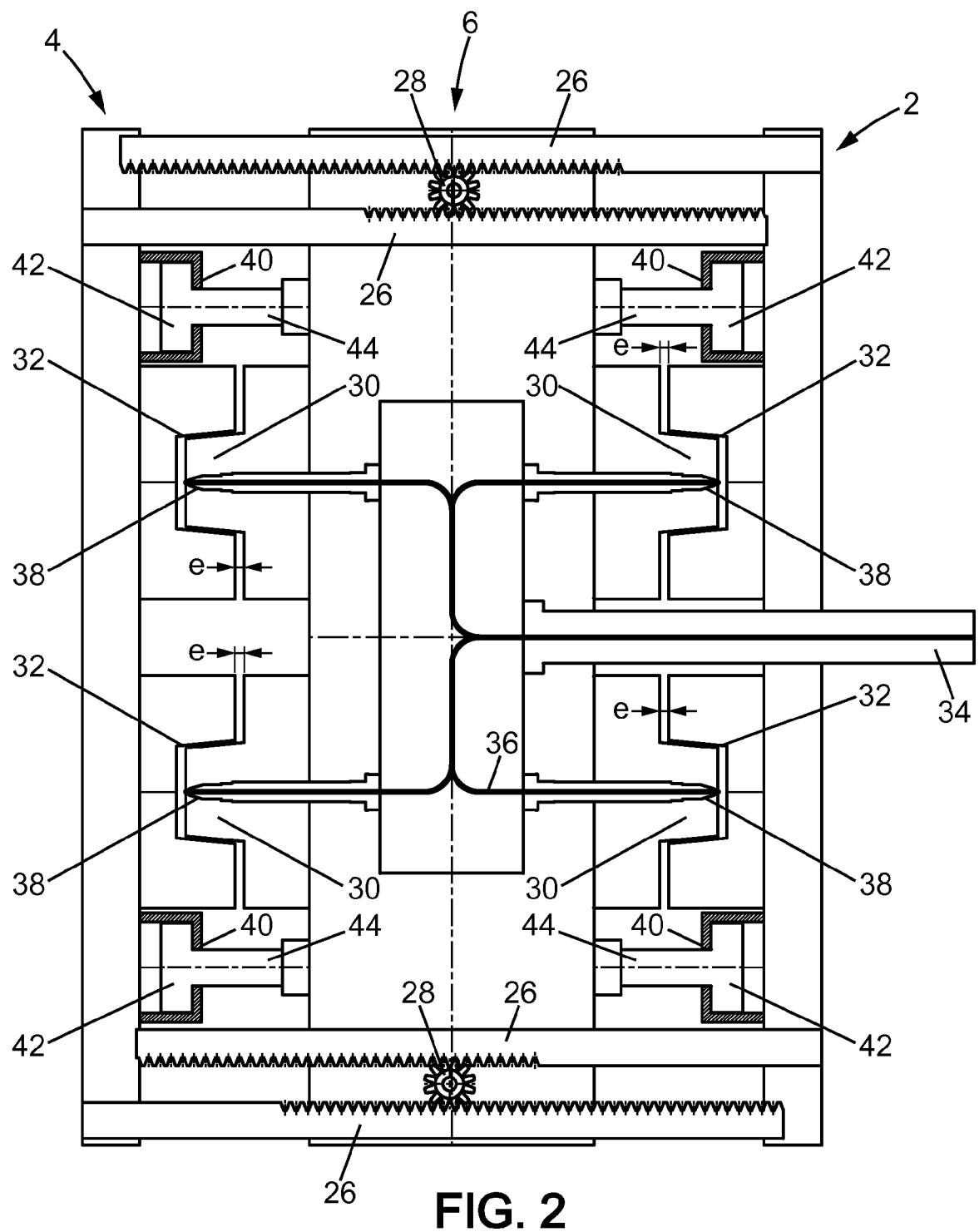
FIG. 2 is a schematic elevation and partial sectional view of a first embodiment of a tandem mold intended for creating parts from synthetic material by injection-compression.

In FIG. 2, there is a schematic representation of the fixed first part 2, the movable second part 4, the floating third part 6, and two cores 30 on each main face of the third support 16 which cooperate with two corresponding impressions 32 mounted on the first support 12 and second support 14. The racks 26 and pinions 28 are also illustrated. In this FIG. 2, the parts of the stacks bearing the cores 30 are not in contact with the parts of the stacks bearing the impressions 32, and a gap e remains each time. As the parts of the stacks are close to one another, one can easily visualize the parting surfaces of the illustrated mold. A line 36 schematically illustrates a path for feeding the synthetic material via injection tube 34 into the cavities defined by the cores 30 and the corresponding impressions 32, through injectors 38.

One will also note the presence in FIG. 2 of four actuating cylinders 40. Two actuating cylinders 40 are arranged between the main face of the first support 12 and a main face of the third support 16, and two other actuating cylinders 40 are arranged between the main face of the second support 14 and a main face of the third support 16.

These actuating cylinders 40 form stops which are meant to limit the stroke of the movable second part 4 and of the floating third part 6 during mold closure, and to temporarily prevent the parts of the stacks bearing the cores 30 from coming into contact with the parts of the stacks bearing the impressions 32.

In the embodiment illustrated in FIG. 2, a cylinder chamber is attached in each case to the main face of the first support 12 or second support 14. A piston head 42 slides in the cylinder chamber between two end positions. A piston rod 44 associated with the piston head 42 protrudes from the cylinder chamber and forms a stop which engages with a main face of the third support 16, preventing complete closure of the mold and ensuring a gap e at each parting surface.

With this structure, it is possible to use the illustrated mold to create parts from synthetic material by an injection-compression process. During a mold closure phase, the actuating cylinders 40 are controlled so that their piston rods 42 are extended. The floating third part 6 then abuts against the actuating cylinders 40 attached to the fixed first part 2, and the movable second part 4 abuts against the actuating cylinders 40 attached to the movable second part 4, in each case leaving a gap e at each parting surface. It is sufficient to have enough pressure in the chambers of the actuating cylinders 40 to ensure the gap e at each parting surface. The molten synthetic material can be injected at that moment. The piston rods 44 are then retracted, releasing the mold which can then close. The mold is then locked, compressing the synthetic material injected into the cavities.

Figure 3:
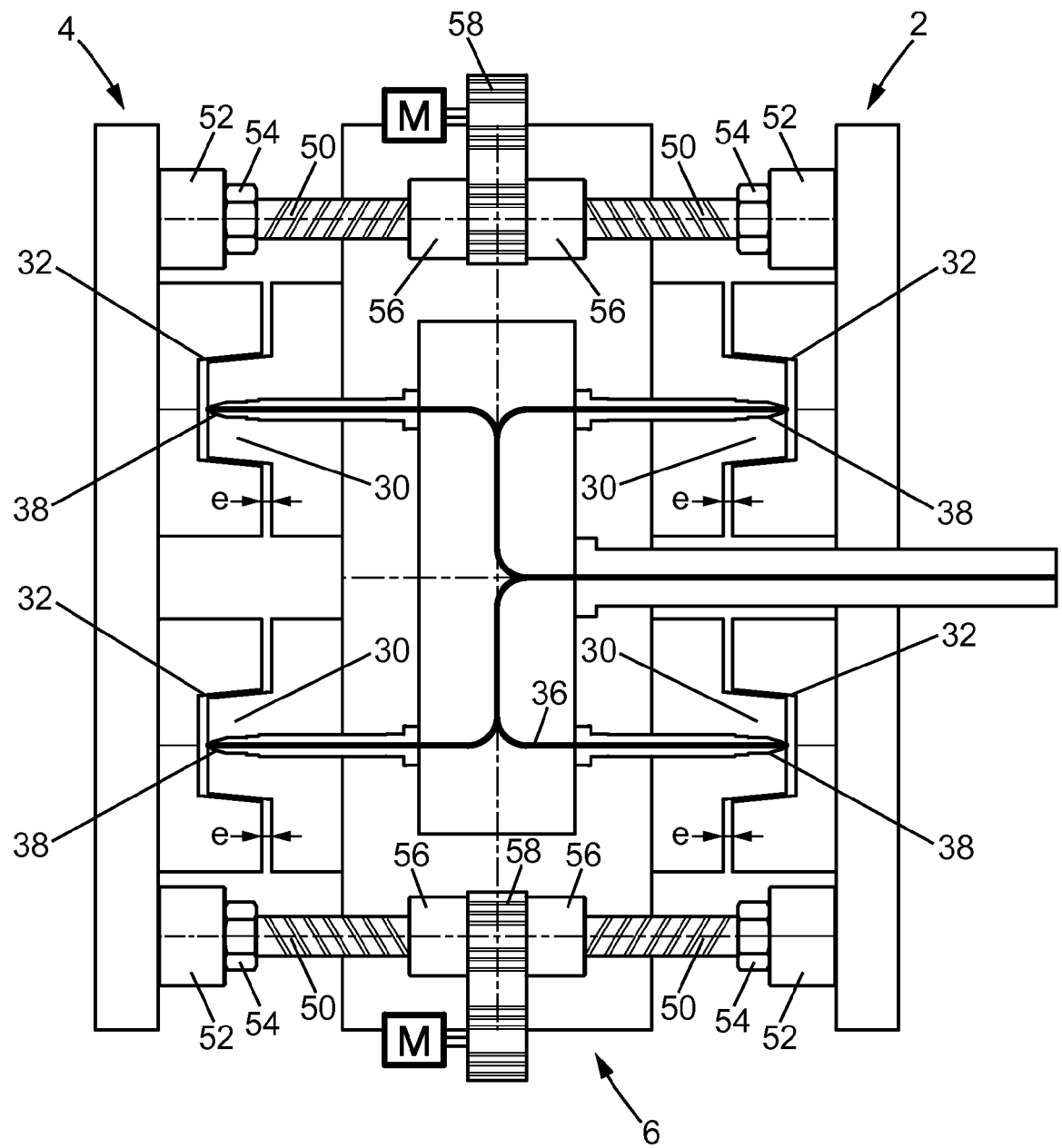
FIG. 3 is a view similar to FIG. 2, illustrating a first variant embodiment.

FIG. 3 illustrates an alternative embodiment which can function according to the same process as above, but the stops are implemented by different means.

Figure 4:
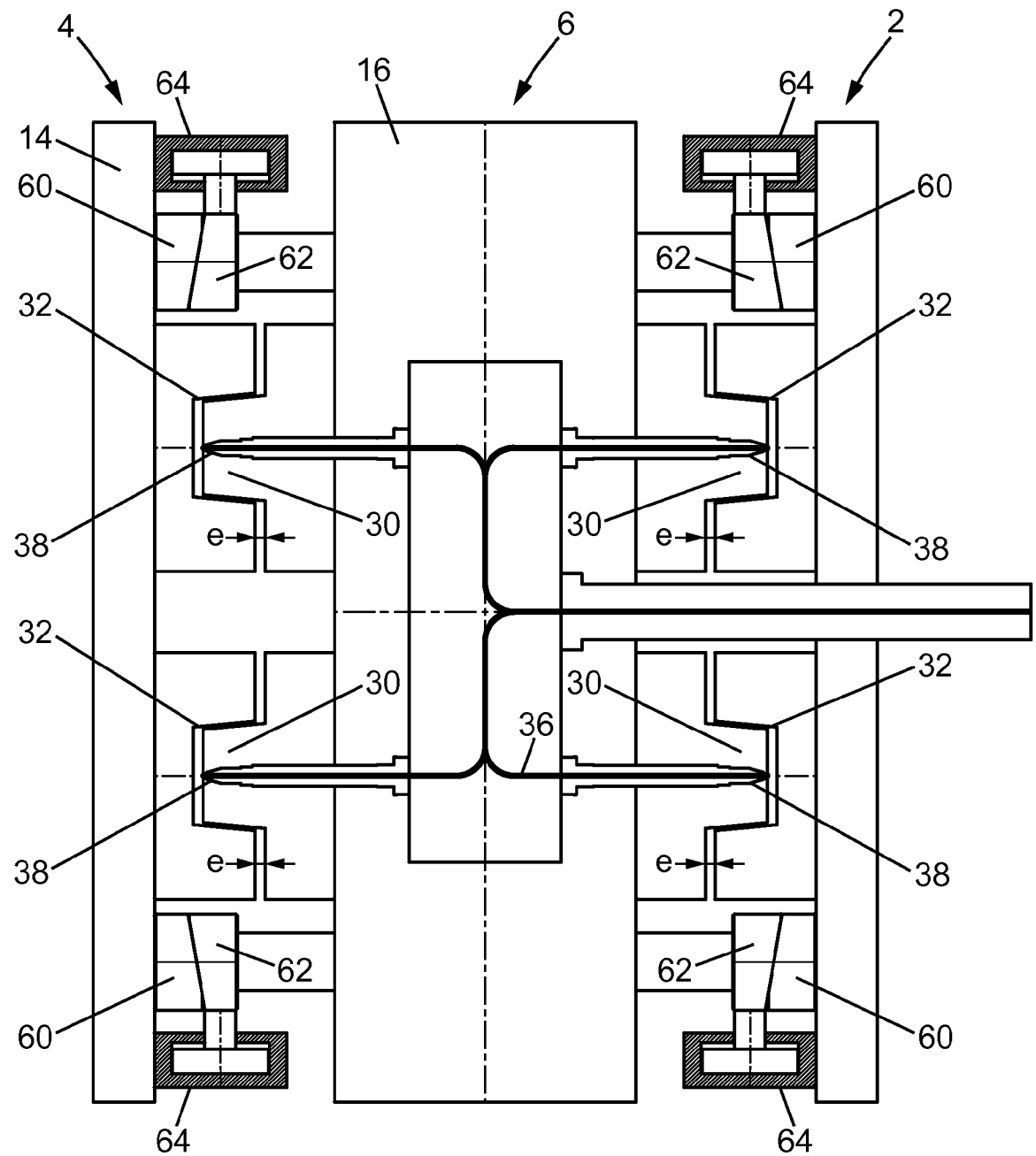
FIG. 4 is a view similar to the views of FIGS. 2 and 3, for a second variant embodiment.

In FIG. 3 and FIG. 4, the racks 26 and pinions 28 have not been represented in order to simplify the figure.

In this embodiment, to limit the stroke between the fixed first part 2 and the floating third part 6 on the one hand, and the movable second part 4 and the floating third part 6 on the other, screws 50 mounted on the floating third part 6 engage with a stop 52 integral to the fixed first part 2 or movable second part 4. In FIG. 3, each screw 50 comprises a stem terminated by a head 54 at the stop 52 side. In addition, each screw 50 is prevented from rotating relative to the floating third part 6. A projection from the screw 50 may, for example, engage with a groove formed on the floating third part 6, or conversely the third part 6 may have a projection engaging with a longitudinal groove of the screw 50. The end of each screw 50 opposite to the corresponding head 54 engages with a threaded sleeve 56. Each sleeve 56 is rotatably mounted.

When the mold is closed, the head 54 of each screw 50 abuts against a stop 52. The position of the screw 50 in its sleeve is such that a gap e remains between the mold parts concerned. When the sleeve 56 is driven in rotation (in the proper direction), the screw 50 enters the sleeve 56 and thus allows the fixed first part 2 or the movable second part 4 to move closer to the floating third part 6.

FIG. 3 illustrates a preferred embodiment where each screw 50 facing a stop 52 integral to the fixed first part 2 is aligned with a screw 50 facing a stop 52 integral to the floating third part 6. The two corresponding sleeves 56 form a single tubular piece having an internal thread and external teeth 58. A motor M is mounted on the floating third part 6. It has an output shaft with a pinion that drives the external teeth 58. In this embodiment, there must be two aligned screws 50 having inverse screw threads. Rotation of the two sleeves 56 thus causes the screws 50 to move closer together or further apart simultaneously.

FIG. 4 illustrates a third embodiment of the stops arranged between the mold parts. Here, a shim with two sides parallel to the main faces is provided. This shim is formed in each case by a fixed wedge 60 and a movable wedge 62. The movable wedge 62 is controlled by an actuating cylinder 64 which allows moving it in a direction parallel to the main faces. It is clear to those skilled in the art that the thickness of the shim formed by the fixed wedge 60 and the movable wedge 62 is variable. This thickness is adjusted so as to prevent the mold from closing and to ensure a gap e at the parting surface in one case, and to allow complete closure and locking of the mold in another case.

Figure 5:
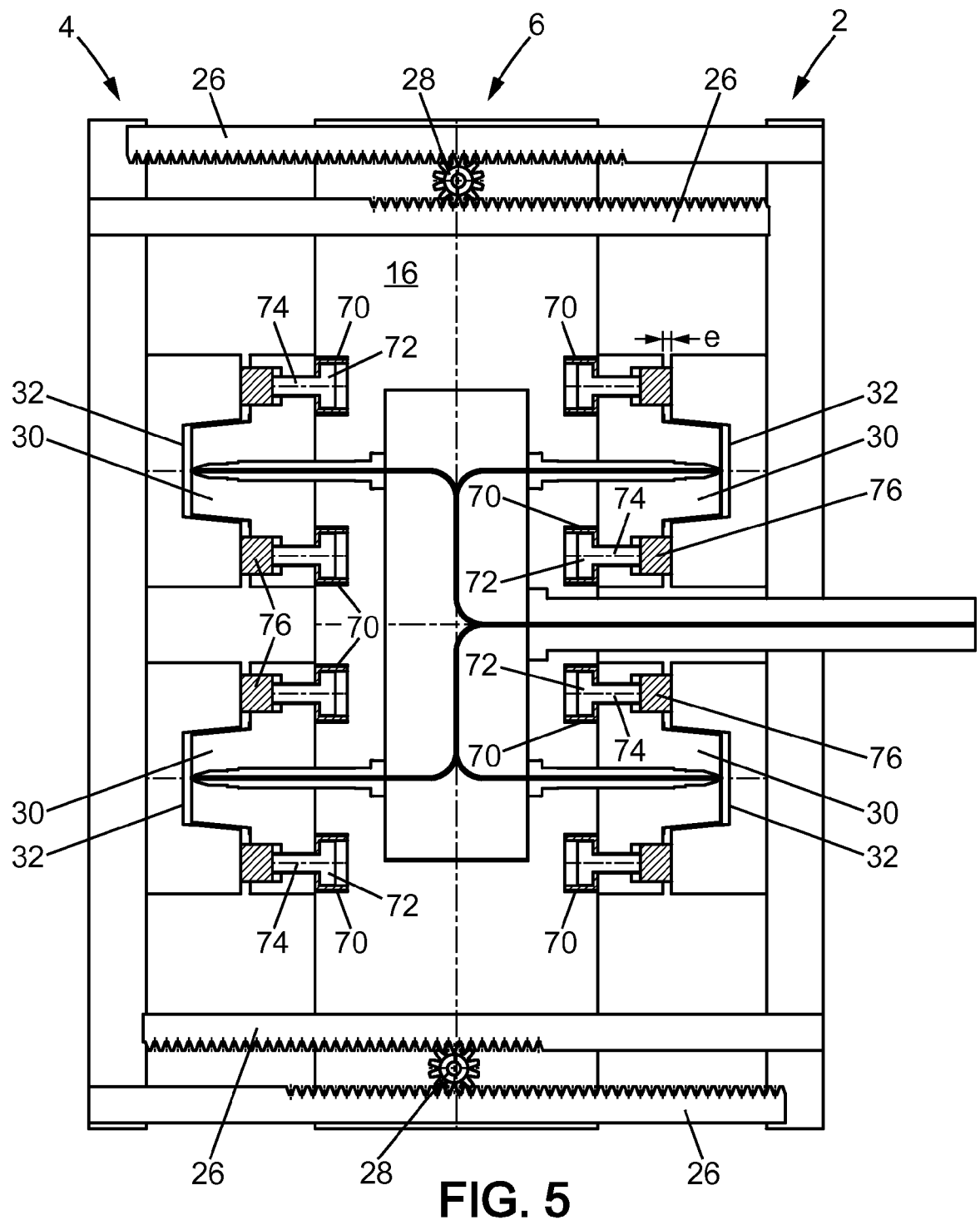
FIG. 5 is a view similar to the views of FIGS. 2 to 4, for a third variant embodiment.

FIG. 5 illustrates an embodiment in which a mechanical stop is provided at each mold stack. In this embodiment, two actuating cylinders 70 are integrated into each part of a mold stack bearing a core 30. The actuating cylinders 70 are diametrically opposed relative to the core 30 of the corresponding part.

For each actuating cylinder 70, a cylinder chamber is integrated into the support 16 of the floating third part 6. It could possibly also be placed in the part of the stack bearing the corresponding core 30. A piston head 72 slides in the cylinder chamber between two end positions. A piston rod 74 associated with the piston head 72 protrudes from the cylinder chamber in the direction of the other part of the stack, the one bearing the impression 32. This other part supports an annular part 76 (not represented in the other figures) which is intended to close off the cavity between the core 30 and the impression 32. The actuating cylinder 70 is sized so that when the piston rod 74 is in its fully extended position (shown in FIG. 5), the gap e remains at the parting surface. The piston rod 74 thus provides the mechanical stop that prevents the mold from closing.

These various embodiments allow the use of a tandem mold, or two-tier mold, to implement an injection-compression process. The structure proposed here allows defining a very precise spacing between the cores and impressions when closing the mold, and then allows complete closure of the mold. Injection of synthetic material can thus be carried out under predetermined conditions defining the opening (or partial opening) of the mold, and then the injected material can be compressed in accordance with known injection-compression methods.

This proposed structure offers the advantage of being usable with various types of tandem molds. This structure can, for example, be used on a mold where the various parts are not interconnected by a rack and pinion system but by other connecting means (for example a mold such as the one disclosed by EP 1 784 295).

In the embodiments given, the stops are arranged between the main faces of the supports of the mold parts. A stop could be arranged elsewhere in a mold part. In the structure described and illustrated in FIG. 1, it could be arranged in the racks or other elements integral to various parts of the mold. The number of stops illustrated and described is, of course, dependent on the size and geometry of the mold. The skilled person will adapt the number of stops to the space available, the cost, and the technical constraints defining tolerances for the gap at the parting surfaces.

The present invention is not limited to the preferred embodiments described above by way of non-limiting examples. It also relates to variants within the reach of persons skilled in the art which fall within the scope of the following claims.

What is claimed is:

1. A tandem mold for creating injection-molded parts from synthetic material, comprising a first part, a second part, and a third part, as well as a first guide between the first part and the third part; the first guide comprising: at least one first guide column fixed to the first part and at least one ring fixed to the third part, said at least one first guide column slidable within a corresponding ring, and a second guide between the second part and the third part; the second guide comprising: at least one second guide column fixed to the second part and at least one ring fixed to the third part, said at least one second guide column slidable within a corresponding ring, a first parting surface being defined between the first part and the third part and a second parting surface being defined between the second part and the third part, the tandem mold having an open position where the first parting surface and the second parting surface are open, in which respective parts of the tandem mold are spaced apart from one another, and a closed position where the first parting surface and the second parting surface are closed, in which the respective parts of the tandem mold come into contact with one another, wherein said first and second parting surfaces each comprises at least one mechanical stop that is movable between an operative position, where said at least one mechanical stop, comprising a cylinder attached only to the first part, and a cylinder attached only to the second part, which prevents the tandem mold from reaching its closed position by defining a predetermined spacing for each of said first and second parting surfaces between the respective parts of the tandem mold, and a retracted position, in which the tandem mold assumes its closed position.

2. The tandem mold according to claim 1, wherein said at least one mechanical stop is formed by an actuating cylinder arranged between two parts of the tandem mold.

3. The tandem mold according to claim 2, wherein each of said first and second parting surfaces comprises at least two actuating cylinders each forming a stop.

4. The tandem mold according to claim 1, wherein said at least one mechanical stop is formed by at least one screw engaging with at least one nut, a motor being provided to allow relative translation between the at least one screw and the at least one nut.

5. The tandem mold according to claim 4, wherein:
a first screw is engaged with a first nut between the first mold part and the third mold part,
a second screw engaged with a second nut between the second mold part and the third mold part, the second screw being in the extension of the first screw and having a reversed thread relative to the thread of the first screw,
the first nut and the second nut being integrally secured and being rotated by the motor.

6. The tandem mold according to claim 1, wherein said at least one mechanical stop is provided in the form of a movable wedge, wherein the stop is arranged opposite a complementary fixed wedge, the movable wedge and the fixed wedge forming a shim having two parallel faces spaced further apart or closer together depending on the position of the movable wedge relative to the fixed wedge.

7. The tandem mold according to claim 6, wherein said movable wedge is associated with an actuating cylinder arranged transversely to the direction of movement of the movable parts of the tandem mold.

8. The tandem mold according to claim 1, wherein the first part, the second part, and the third part carry mold stacks, each stack comprising a core mounted on the third part and an impression mounted on the first or second part facing the third part bearing the corresponding core, and wherein in each case at least one mechanical stop is arranged at a mold stack, between a peripheral area of the impression and a peripheral area of the corresponding core.

9. The tandem mold according to claim 1, wherein the at least one guide column between the first part and the third part connects one of the first or third mold part to a facing mold part, and wherein the at least one guide column between the second part and the third part connects one of second or third mold part to a facing mold part.

10. The tandem mold according to claim 9, wherein the guide columns are fixed relative to the first and second parts and wherein the guide columns are each slidable within a corresponding ring that is fixed on the third part.

11. The tandem mold according to claim 1, further comprising at least one rack fixed to the first part and engageable with at least one pinion rotatably mounted on the third part, and at least one rack fixed to the second part and engageable with the at least one pinion rotatably mounted on the third part in order to achieve movement of the third part.

12. An injection molding machine, comprising a mold according to claim 1.

* * * * *